US012342058B2

(12) United States Patent
Lui

(10) Patent No.: US 12,342,058 B2
(45) Date of Patent: Jun. 24, 2025

(54) MULTI-CAMERA IMAGING DEVICE AND SYSTEM WITH SIMULTANEOUS IMAGE/VIDEO CAPTURE

(71) Applicant: Ying Lun Lui, New Territories (HK)

(72) Inventor: Ying Lun Lui, New Territories (HK)

( * ) Notice: Subject to any disclaimer, the term of this patent is extended or adjusted under 35 U.S.C. 154(b) by 55 days.

(21) Appl. No.: 18/550,716

(22) PCT Filed: Aug. 25, 2021

(86) PCT No.: PCT/IB2021/057780
§ 371 (c)(1),
(2) Date: Sep. 15, 2023

(87) PCT Pub. No.: WO2022/195342
PCT Pub. Date: Sep. 22, 2022

(65) Prior Publication Data
US 2024/0107137 A1     Mar. 28, 2024

(30) Foreign Application Priority Data

Mar. 19, 2021  (HK) ........................... 32021027800.0
Jun. 25, 2021  (HK) ........................... 32021033662.6

(51) Int. Cl.
*H04N 23/45*     (2023.01)
*H04N 23/63*     (2023.01)
*H04N 23/661*    (2023.01)

(52) U.S. Cl.
CPC ........... *H04N 23/45* (2023.01); *H04N 23/631* (2023.01); *H04N 23/633* (2023.01); *H04N 23/661* (2023.01)

(58) Field of Classification Search
CPC .... H04N 23/45; H04N 23/631; H04N 23/633; H04N 23/66; H04N 23/661; H04N 23/90
See application file for complete search history.

(56) References Cited

U.S. PATENT DOCUMENTS

| 9,253,397 | B2 * | 2/2016 | Lee | ................ | H04N 23/698 |
| 2014/0132735 | A1 * | 5/2014 | Lee | ................ | H04N 23/698 |
| | | | | | 348/47 |
| 2014/0168355 | A1 | 6/2014 | Pillarisetty | | |
| 2017/0006210 | A1 | 1/2017 | Dye | | |
| 2017/0214852 | A1 | 7/2017 | Yoon | | |
| 2017/0351900 | A1 | 12/2017 | Lee | | |
| 2018/0249062 | A1 | 8/2018 | Jin | | |
| 2023/0262318 | A1 * | 8/2023 | Lee | ................ | H04M 1/0241 |
| | | | | | 348/36 |

\* cited by examiner

*Primary Examiner* — Antoinette T Spinks
(74) *Attorney, Agent, or Firm* — Hinckley Allen & Snyder; Stephen Holmes

(57) ABSTRACT

An imaging device comprises a controller, a plurality of cameras and a wireless interface for coupling the imaging device to an external electronic device. Each camera comprises a lens, an image sensor and an image signal processor (isp). The controller is configured to control one or more of the cameras according to a command received from an external electronic device to capture an image and send the captured image to the external electronic device when the imaging device is coupled to the external electronic device via the wireless interface. A method of capturing images using the imaging device and a computer readable storage medium storing instructions which are executable to establish a wireless communication link between an electronic device and the imaging device are also provided.

19 Claims, 7 Drawing Sheets

MULTI-CAMERA IMAGING DEVICE AND SYSTEM WITH SIMULTANEOUS IMAGE/VIDEO CAPTURE

TECHNICAL FIELD

The present disclosure relates to an imaging device and a method of capturing image data.

BACKGROUND

Photo and video capture functions are some of the most popular features of electronic devices such as smartphones, computers, laptops, multi-copters, tablets and other electronic devices. Modern electronic devices may be equipped with integrated high-resolution camera(s), which enable users to capture images. The images produced by such camera(s) can be of relatively high quality when captured in a well-illuminated environment. However, image quality is limited by the quality of camera and can suffer when lighting or other conditions are not optimal, especially for devices with older cameras. Furthermore while an electronic device may have a useful life of many years, the camera integrated to an electronic device may quickly become dated compared to new models on the market and may provide only limited camera lens options compared to the very fast pace of technological development in cameras, especially in the smartphone market.

SUMMARY

A first aspect of the present disclosure provides an imaging device, comprising: a controller; a plurality of cameras, each camera comprising a lens, an and a corresponding image sensor and a image signal processor (isp); and an wireless interface for coupling the imaging device to an external electronic device. The controller is configured to control one or more of the cameras according to a command received from an external electronic device to capture an image and send the captured image to the external electronic device when the imaging device is coupled to the external electronic device via the wireless interface.

In the context of this disclosure a camera is a device which is capable of capturing and recording an image. The camera may comprise a lens and a corresponding image sensor and image signal processor (isp), such that light is focused by the lens onto the image sensor and the image sensor generates electric signals which are processed by the image signal processor to generate a captured image. The term camera as used herein therefore does not necessarily refer to a stand-alone device, and may refer to a small compact set of components which are capable of capturing an image. The cameras may be similar to the small cameras which are commonly installed on smartphones. However, according to the present disclosure multiple cameras are housed on a separate imaging device, which may be wirelessly linked to one or more external electronic devices such as, but not limited to, smartphones.

Depending on the implementation, the cameras may be capable of capturing individual still images, a plurality of successive images forming a video, or both still images and videos. Thus in some examples one or more of the cameras may be controlled to capture and send one or more still images to the external electronic device. In other implementations, one or more cameras may be controlled to capture a video and send the video to the external electronic device.

The plurality of cameras may have the same type of lenses or different types of lenses from each other, or some cameras may have the same type of lens while other cameras have a different type of lens. Different types of lens may have different refractive properties from each other, e.g. different focal lengths or field of view etc. In some examples, lenses of two or more of the plurality of cameras may be positioned on the frame such that they point in different directions.

In some examples the controller of the imaging device and/or the processor of the external electronic device may combine images captured from two or more of the plurality of cameras to form a merged image. This may help to enhance image quality and may be performed automatically or in response to a user input via the user interface of the external electronic device. In one example the imaging device captures images using multiple wide angle lenses and merges them together to form an image covering a wider field of view than is possible by a single wide angle lens alone. In one example images are captured using three wide angle lenses with three different focus points and the images are merged together.

The controller may for example be a processor or electronic control circuitry. Controlling the one or more of the cameras may include actuating a selected camera to capture image data (i.e. take a still photo or record a video). In some examples this may include actuating the selected camera to capture one or more images (or a video comprising multiple images). The captured image data may be stored locally on the imaging device or may be transmitted via the interface to the external electronic device. Alternatively or additionally controlling the one or more of the cameras may include adjusting one or more parameters of the camera such as shutter speed, aperture size, zoom, focus and flash settings etc. The wireless interface may be used to establish a wireless communication link with the external electronic device. In some examples the user may also have the option of connecting the imaging device to the external electronic device by a wired link, such as a data cable; for instance to provide a backup for the wireless interface. In some examples the wired or wireless communication link may also be used to deliver power to the imaging device.

The imaging device may include a stand so that it can be supported and/or hung in a variety of positions remote from the electronic device. For instance on a table top, shelf etc. In some examples, the imaging device may be attached to or incorporated into a drone. In some examples.

The external electronic device may for example be a smartphone, tablet computer, laptop, computer, quadcopter, Smart TV, security system, etc.

The imaging device according to an example of the present disclosure may provide additional options for the users to use different type of camera options to take better quality image data in various of different lighting conditions along with other varying conditions and/or situations that may exist that require different types of camera options to capture better image data and also be able to take more additional types of pictures/video from more possible angles without limited to just using the current camera lens that are embedded with their electronic devices (e.g. smartphones).

In some examples, the imaging device may be referred to as a Wireless Multiple photo and video Camera Device.

A second aspect of the present disclosure provides a non-transitory computer readable storage medium storing instructions which are executable by a processor of an electronic device to establish a wireless communication link between the electronic device and an imaging device comprising a plurality of cameras, wherein the electronic device is external to the imaging device. The instructions further include instructions to, in response to wirelessly receiving a control command from a user of the electronic device over the wireless communication link, send a control signal over the wireless communication link to the imaging device to control one or more of the plurality of cameras of the imaging device in accordance with the control command received from the user. The instructions further include instructions to receive image data from the one or more cameras of the imaging device over the wireless communication IiA third aspect of the present disclosure provides an imaging system comprising the imaging device of the first aspect of the present disclosure and an external electronic device coupled to the imaging device via the wireless interface of the imaging device, wherein the external electronic device comprises a display, a processor and a computer readable storage medium according to the second aspect of the present disclosure.

A fourth aspect of the present disclosure provides a method of capturing images using a imaging device comprising a controller, a plurality of cameras and a wireless interface. The method comprises coupling, by the wireless interface of the imaging device, the imaging device to an external electronic device and receiving, at the external electronic device, a command from a user to activate one or more cameras of the imaging device. The method further comprises sending, from the external electronic device to the imaging device via the wireless interface of the imaging device, an instruction to activate one or more cameras of the imaging device and receiving, by the controller of the imaging device, the instruction from the external electronic device to activate one or more of the cameras of the imaging device. The method further comprises controlling, by the controller of the image device, one or more cameras of the imaging device to capture one or more images in response to the instruction; and sending, by the controller of the imaging device, the one or more captured images to the external electronic device via the wireless interface of the imaging device.

A fifth aspect of the present disclosure provides an imaging device for capturing photos and/or videos, comprising: multiple camera components including multiple lenses, multiple image sensors and multiple image signal processor (isp) panels; a processor and a frame for housing the multiple camera components; and an electronic wireless connector configured to wirelessly link the imaging device to an external electronic device.

The multiple lenses and image sensors of the imaging device effectively increase the camera lens and image sensor options that the user of the electronic device has access too, rather than solely on the options provided by their electronic devices' internal camera (if any). In this way the user use the camera components of the imaging device via the wireless link to their electronic device when they desire higher quality and/or different type of photos/video functionality is desired and/or more possible angle image data than is available through the camera components of their electronic device.

It will be appreciated that the imaging device may include multiple lenses and or other multiple camera components that are configured to direct light onto multiple image sensors that are disposed within a frame of the imaging device.

In some embodiments, the imaging device may include a storage slot to allow for different types of storage options. The imaging device may be configured to transmit captured image/video and/or live image data to electronic device for storage on the electronic device when imaging device is wirelessly linked to the electronic device in the event and/or store the images on the storage. For example, the images may be transmitted to the electronic device if the cannot be stored on the storage of the imaging device, e.g. due to lack of storage space or other reasons, and audio data captured by a microphone.

BRIEF DESCRIPTION OF THE DRAWINGS

Examples of the present disclosure will be explained below with reference to the accompanying drawings, in which.

DETAILED DESCRIPTION OF THE PREFERRED EMBODIMENTS

Figure 1:
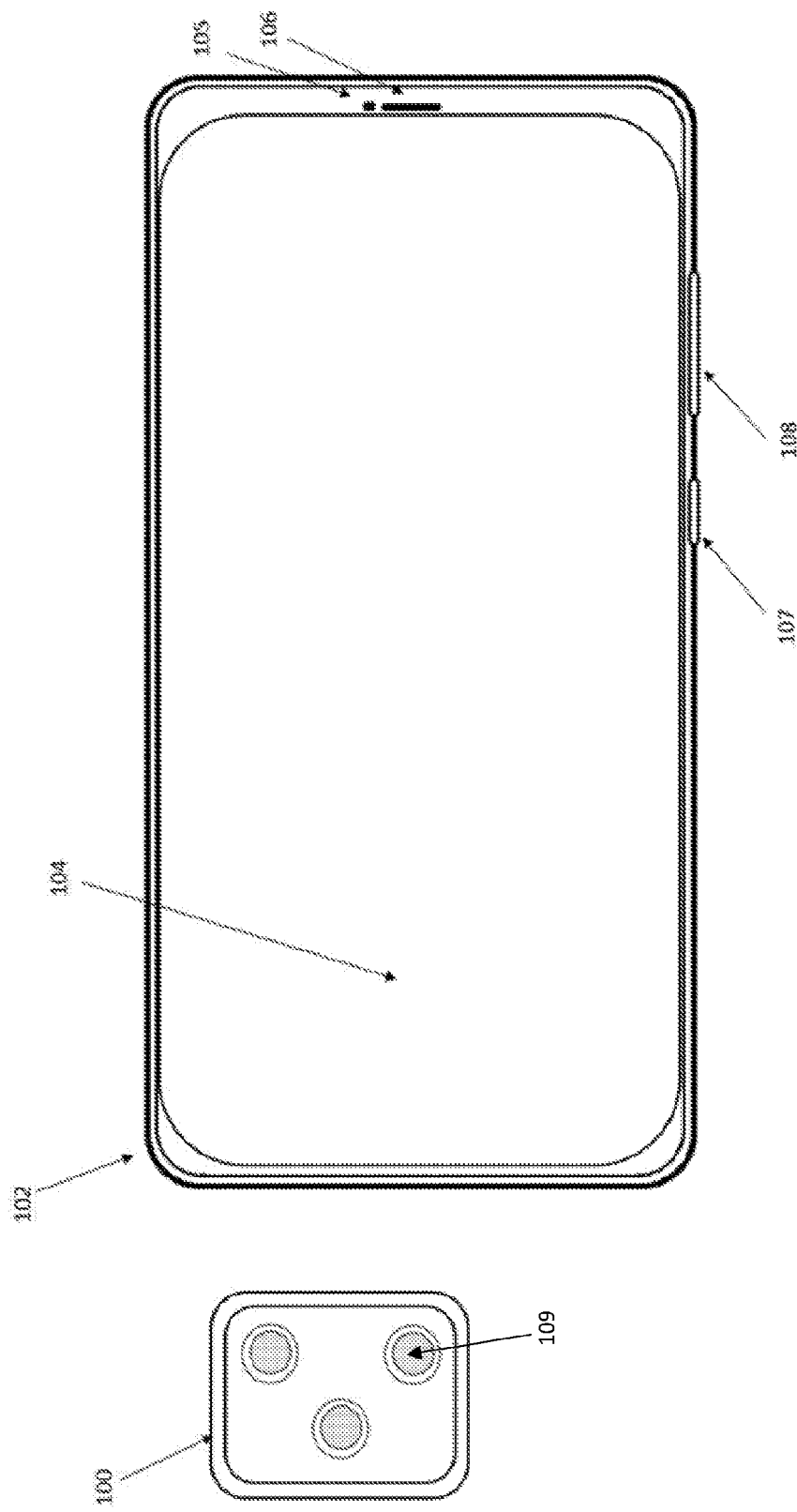
FIG. 1 is a front view of an imaging device wirelessly linked to a front view of an electronic device.

Various examples of the disclosure are discussed below. While specific implementations are discussed, it should be understood that this is done for illustrative purposes and variations with other components and configurations may be used without departing from the scope of the disclosure as defined by appended claims.

The present disclosure proposes providing an imaging device for use with an electronic device such as a smartphone, computer, laptops, multi-copter or tablet computer etc. The imaging device is separate from the electronic device, but may for instance be purchased as an accessory for use with the electronic device. The imaging The imaging device may allow the electronic device to capture images, even if the electronic device does not include a camera, or in the case that the electronic device already includes a camera, the imaging device may expand the number and/or type of cameras available to the electronic device. As the electronic device is separate from the imaging device it may be referred to as an "external electronic device" from the point of view of the imaging device.

The imaging device comprises a controller and a plurality of cameras, wherein each camera comprises a lens, an image sensor and an image signal processor (isp). The imaging device further comprises a wireless interface (also referred to as an "electronic wireless connector") for coupling the imaging device to an external electronic device. The controller may be configured to control one or more of the cameras according to a command received from an external electronic device to capture an image and send the captured image to the external electronic device when the imaging device is coupled to the external electronic device via the wireless interface.

In this way, the images captured by one or more cameras of the imaging device may be used by the electronic device. The imaging device thus provides more camera lens options for the electronic device. A user of an electronic device, such as but not limited to a smartphone, may thus gain the advantage of the latest camera lenses and technology without having to buy a new electronic device. As an imaging device may have more advanced cameras than the electronic device, the imaging device may help to compensate for the non-optimal lighting conditions. As the imaging device is separate from the electronic device, the imaging device may also provide a greater range of image taking angles than is possible using camera lenses of the electronic device.

In some examples, one or more cameras may be capable of capturing a plurality of successive images forming a video stream. In some examples, the controller is configured to control one or more of the cameras according to a command received from an external electronic device to capture a plurality of successive images forming a video and send the video to the external electronic device when the imaging device is coupled to the external electronic device via the wireless interface.

FIG. 1 illustrates an exemplary embodiment of an imaging device 100 according to the present disclosure. The imaging device may be also be referred to as a "Wireless Multiple photo and video Camera Device". The imaging device 100 is configured for use with an electronic device 102, which is separate from and external to the imaging device 100. The imaging device 100 may be configured to communicate wirelessly with the electronic device 102. The electronic device 102 may be any computing device. In some examples the electronic device may be a portable device. For example, the electronic device 102 may be any of a variety of well-known devices, including smartphones, tablets, laptops, computers, desktop computers, quadcopters, Smart TVs, security systems, and other smart devices, etc. In the illustrated embodiment, the electronic device 102 is a smartphone that includes, a touch-enabled display 104, a small front-facing ("selfie") camera 105, a speaker 106, a power on/off button 107 and a volume up and down button 108.

Figure 2:
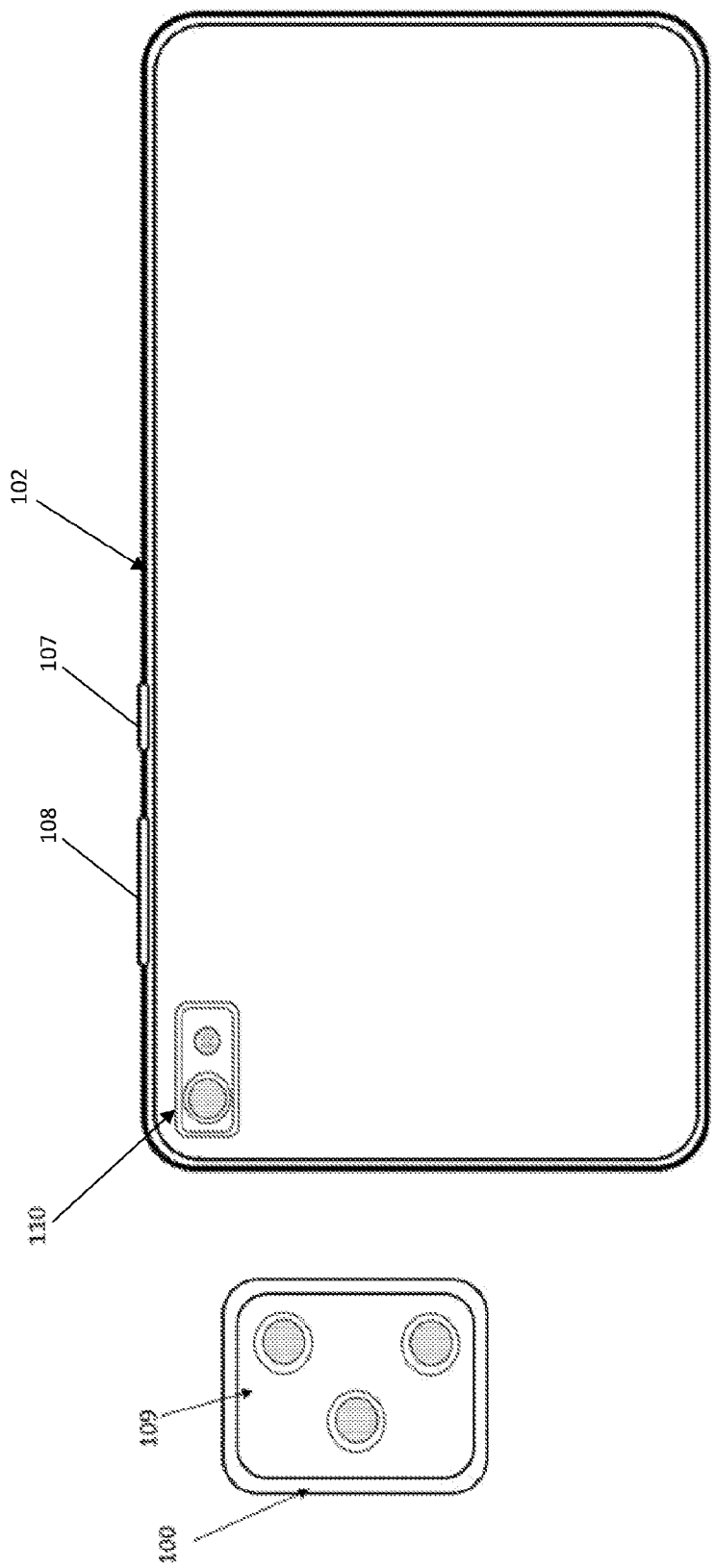
FIG. 2 is a front view of the imaging device wirelessly linked to back view of an electronic device of FIG. 1.

Whereas FIG. 1 shows a front view of the imaging device 100 and electronic device 102, FIG. 2 shows a front view of the imaging device 100 and a back view of the electronic device 102. Like reference numerals denote like parts as in FIG. 1. As shown in FIG. 2, the back side of the electronic device 102 may include a back facing camera 110. The back facing camera 110 may have a larger lens than the front facing camera 105.

The imaging device 100 includes a plurality of cameras 109. While three cameras 109 are shown in the illustrated example, in other examples the imaging device may have two cameras or more than three cameras. The cameras of the imaging device 100 may have lenses such as a wide-angle lens, an ultrawide-angle lens, a macro lens and a telephoto lens or other types of lens. In some examples each camera of the plurality of cameras 109 has a different type of lens. In other examples, at least some of the cameras 109 have the same type of lens. Furthermore, the lenses of the different cameras may face in a same direction as in FIGS. 1 and 2, or may face in different directions; in some cases the lenses of at least some of the cameras may be on different sides or different faces of the imaging device in order to afford a wider range of viewing angles. As the imaging device 100 is separate from the electronic device 102, it will be appreciated that it can be positioned away from the electronic device in any convenient desired position in order to capture images which would not be possible using the electronic device alone. For instance, the imaging device may be positioned in front of the user so that the user can take a selfie without obscuring their face with the electronic device, as often happens when taking a 'selfie' with a smartphone.

In some examples, the imaging device may have a length of four centimetres or less, a width of five centimetres or less, and a depth of up to two centimetres. Of course, this is just an example and the imaging device may have any size which is required to property fit the multiple camera components & the multiple image sensors.

In some examples the imaging device the cameras and/or image sensors may have a resolution of three or more megapixels and/or may include full frame image sensors.

Figure 4C:
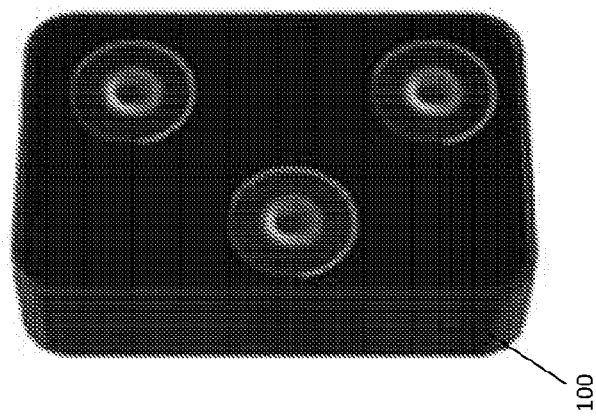
FIG. 4C is a rendered perspective view of the imaging device of FIG. 1.
Figure 4B:
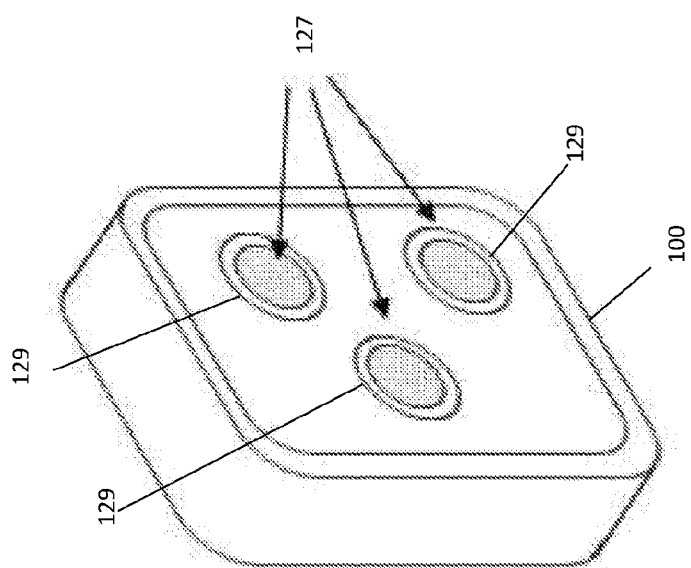
FIG. 4B is perspective view of the imaging device of FIG. 1.
Figure 4A:
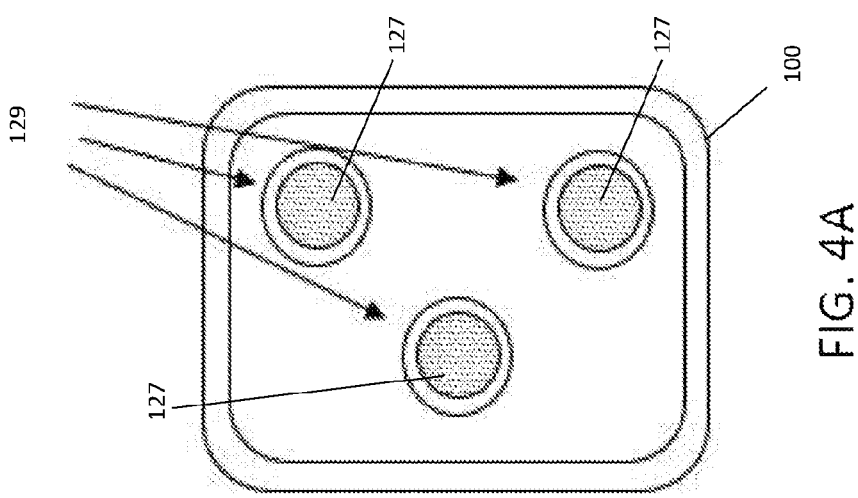
FIG. 4A is front view of the imaging device of FIG. 1.

FIG. 4A shows another front view of the imaging device 100, while FIG. 4B shows a perspective view and FIG. 4C shows a rendered perspective view. FIGS. 4A-4C shows the lenses 127 of each camera. In some examples, one or more of the cameras 109 of the imaging device 100 may be associated with a button of the imaging device and pressing the button may activate the camera to record one or more images with the camera. In the example of FIGS. 4A-4C, each camera is associated with a respective button 129 which may be pressed to activate the camera. The button may have a ring shape surrounding the camera. In other examples, the imaging device does not include buttons for activating the cameras and activation is instructed remotely via the electronic device 100 over the wireless interface.

Each camera 109 may comprise a lens, an image sensor and an image signal processor (isp). [Each camera may include further additional camera components. The imaging device thus includes a frame or body 109 in which multiple camera components and the multiple camera lenses 127 are mounted. The imaging device 100 may be wirelessly linked to the electronic device 102 by a wireless interface. The wireless interface may, for example, comprise a Wi-Fi, Bluetooth, near field communication (NFC), infra-red (IR) or cellular transceiver. The imaging device 100 also includes a controller, such as a processor, which is configured to control the multiple cameras and multiple lens system 121 and communicate with the electronic device 102.

Notably, in some implementations, the imaging device 100 does not include various features which are typical of a dedicated digital camera. For example, in some examples the imaging device 100 does not include one or more of the following: a display screen, shutter button, control pad, or other user interface. Instead, the user interface and/or display screen may be implemented by the electronic device 102. The imaging device 100 may thus be controlled by the electronic device 102, and may transmit captured images and video to the electronic device 102 for processing, storage, sharing, etc. The imaging device 100 in accordance with these examples, may thus provides a simple, compact, lightweight, and inexpensive solution that improves the photographic capabilities of the electronic device by providing multiple cameras 109, which may be used instead of or in addition to cameras installed on the electronic device. For instance, the imaging device 100 may be used with electronic devices which do not have any cameras or which only have outdated cameras.

Figure 3:
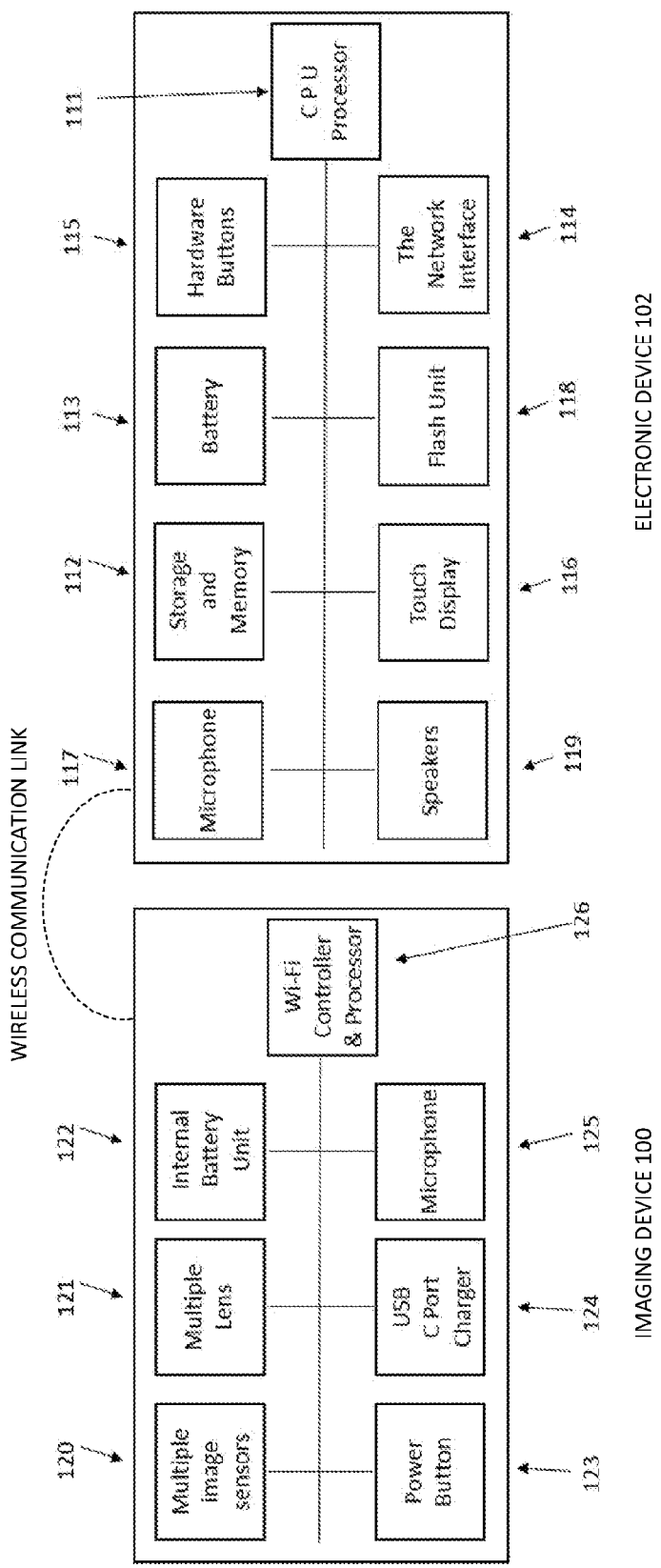
FIG. 3 is a schematic block diagram of the imaging device and electronic device of FIG. 1.

FIG. 3 is a schematic block diagram showing an example structure of an imaging device 100 according to the present disclosure. FIG. 3 also shows an exemplary structure of an electronic device 102 coupled to the imaging device 100 by a wireless communication link.

The illustrated example imaging device 100 includes multiple lenses 121, image sensors 120 and isps (not shown) which together form a plurality of cameras.

In some examples, each lens of the multiple lenses 121 (127 in FIGS. 4A-4C) may be a different type of lens. For instance, one of the multiple lens 127 may be a lens for taking normal wide-angle image data. One of the multiple lenses 127 may be a lens that has an optical zoom function to capture far distance image data. One of the multiple lenses 127 may be a lens that has a macro function for taking close up image data. One of the multiple lenses 127 may be a lens that can has a wide-angle function to take very wide-angle image data. One of the multiple lenses 127 may be a lens that has a steady optical image stabilizer mechanism to capture normal image data or far distance image data or Marco image data or wide-angle image data. One of the multiple lenses 127 may be a thermal lens.

The imaging device 100 further includes a wireless interface, such as but not limited to a Wi-Fi controller, to enable the wireless communication with the electronic device 102 and a processor which acts as a controller for controlling operation of the imaging device. In some examples, the wireless interface and the processor may be integrated together as a single module 126, as shown in FIG. 3, or may be provided as separate components. The processor is configured to receive a command from the electronic device, over the wireless interface, control one or more of the cameras (including the multiple image sensors 120 and multiple lenses 121) according to the received command to capture one or more images and send the captured image(s) to the electronic device over the wireless interface.

The imaging device 100 may further comprise a power supply, such as an internal battery unit 122, for supplying power to the components of the imaging device and a power button 123 for switching the imaging device on and off.

In some examples, the imaging device may further comprise a power module to receive power from an external power source. In some examples the imaging device may further comprise a port for connecting the imaging device to an external electronic device via a data cable; this provides a further option for communication with the electronic device 102 in addition to the wireless interface 126. In the illustrated example, a USB port 124 acts as one or both of a power module for receiving power from an external power source and a data port for connecting to a data cable.

In the illustrated example of FIG. 3, the imaging device 100 does not include a shutter button for activating one of the cameras to capture an image, but rather the cameras may be activated by the processor 126 in response to an instruction wirelessly received via the wireless interface 126. In the illustrated example of FIG. 3, the imaging device 100 does not include a display screen, but rather a view finder function for the camera may be provided by a display of the electronic device. In the illustrated example of FIG. 3, the imaging device 100 does not include a user interface, but rather a user interface for controlling the cameras may be provided by the electronic device which is wirelessly coupled to the imaging device.

The illustrated example electronic device 102 in FIG. 3 includes a processor 111 which controls the operation of the electronic device, for example by executing an operating system (OS), device drivers, application programs, and so forth. The processor 111 can include any type of microprocessor or central processing unit (CPU), including programmable general-purpose or special-purpose microprocessors and/or any of a variety of proprietary or commercially-available single or multi-processor systems. The electronic device 102 may also include a non-transitory storage medium such as a memory 112, which provides temporary or permanent storage for code to be executed by the processor 111 or for data that is processed by the processor. The electronic device 102 may also include a power supply, such as a battery 113, for providing operating power for the electronic device 102.

The electronic device 102 includes a wireless network interface 114 which enables the electronic device 102 to communicate with remote devices (e.g., computer systems or other mobile devices) over a network. Exemplary wireless network interfaces include cellular voice and/or data network transceivers, as well as Wi-Fi, Bluetooth, NFC, and IR transceivers.

The electronic device 102 may include hardware buttons 115 which can be actuated by a user to provide input or otherwise interact with the electronic device 102.

The electronic device may include a touch-enabled electronic display 116 for displaying images, such as a graphical user interface, in accordance with instructions received from the processor 111. The microphone 117 receives and converts acoustic energy into electronic signals for processing and/or storage by the electronic device 102. The flash 118 is a light source (e.g., one or more the illustrated Wireless Multiple photo and video Camera Device 100 includes multiple camera components 128, multiple lens 127, multiple image sensors 120, a multiple lens system 121, and a Wi-Fi Controller 126 and CPU Processor.

FIGS. 1-3 thus show an imaging system comprising an imaging device coupled to an imaging device via the wireless interface of the imaging device, wherein the external electronic device comprises a display, a processor and a computer readable storage medium.

While FIGS. 1-3 show the imaging device wirelessly coupled to a single electronic device, in some examples the imaging device may be configured to be coupled by the wireless interface to two more electronic devices at the same time. In this way more than one electronic device may take advantage of the cameras of the imaging device. For instance, a number of people in the same location could use the imaging device to take a selfie photo or participate in a video conference and have the captured images or video stream transmitted to their respective electronic devices.

Figures 5A, 5B:
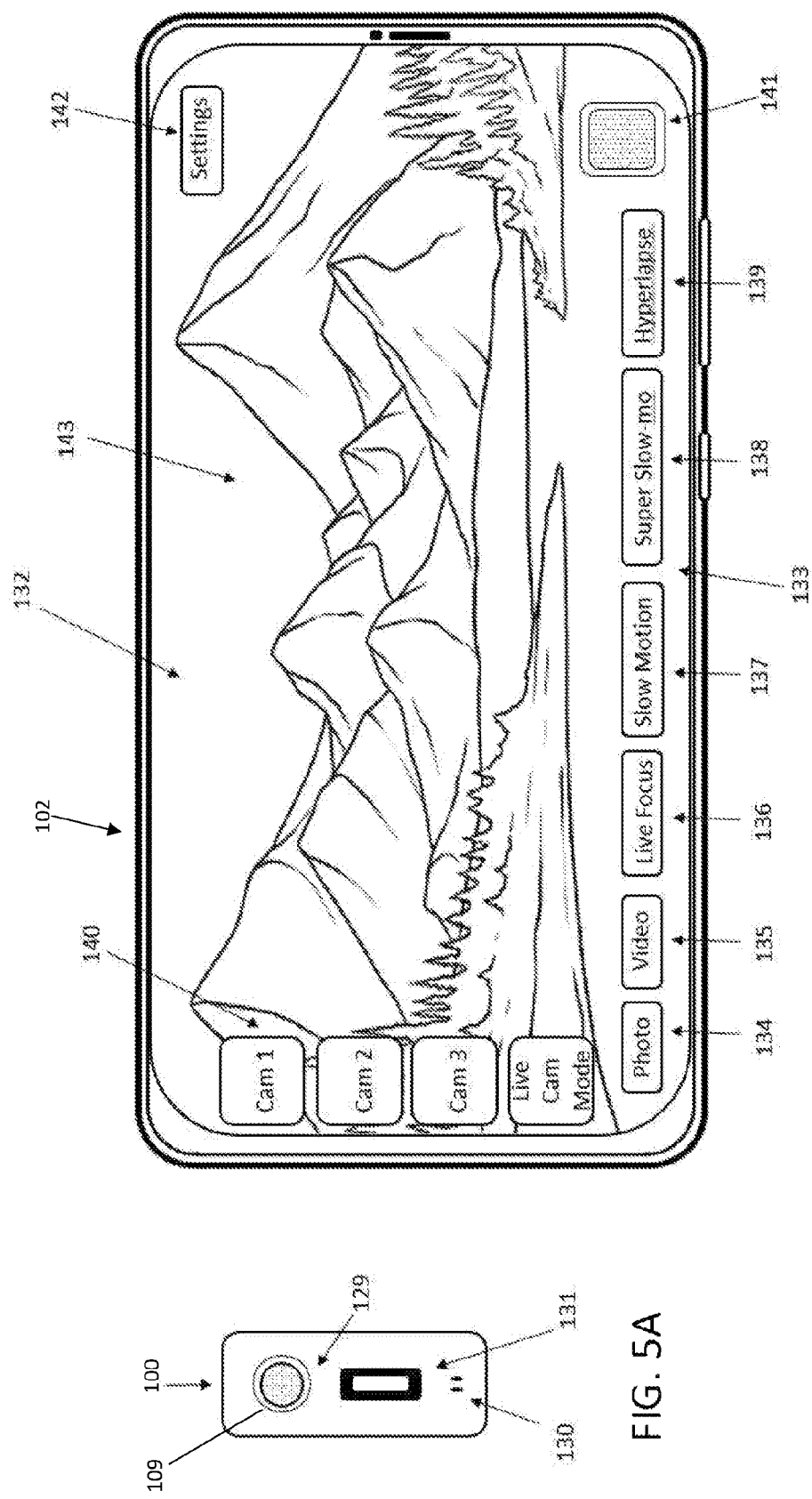
FIG. 5A is a side view of an imaging device linked with electronic device front side of FIG. 1 with a power button used to turn on/off the system and also used to press to record/stop, with a microphone and with an USB C port for charging and/or data transfer.
FIG. 5B is the camera application interface showing a live feed from the imaging device ready to capture image data.

FIG. 5A shows an example of the imaging device 100, while FIG. 5B shows an example of a display screen and user interface of the electronic device 102 which may be used to control one or more cameras of the imaging device and display images captured by one or more cameras of the imaging device. The imaging device has at least two cameras, but only one of the cameras 109 is shown in FIG. 5A. The camera 109 captures an image which is transmitted to electronic device 100 and displayed on a display of the electronic device 100, as shown in FIG. 5B.

The one or more cameras of the imaging device 100 may be controlled by the electronic device 102 sending commands wirelessly to the imaging device. In the example of FIG. 5A, the imaging device 100 further includes a button 129 which can be actuated by a user to capture a still image or, when in a video capture mode, to start or stop recording of a video. Thus, in the example of FIG. 5A, the user may capture images either by sending a command from the electronic device 102 or by pressing a button 129 on the imaging device. In other examples, the imaging device may not have a button for activating a camera to capture images and the image capture may be controlled solely by sending commands from the electronic device.

The electronic device 102 includes a display screen 132 having a display area where a real-time feed of images captured by one or more cameras of the imaging device can be displayed. The display area of the display screen thus acts as a view finder for the one or more cameras of the imaging device. The electronic device may also have a user interface for controlling the one or more cameras. For example, the user interface may be displayed on the display screen of the electronic device. In some examples the display screen 132 is a touch screen and components of the control interface may be displayed on the touch screen.

The user interface may include a toolbar 136 with a plurality of buttons for selecting various functions of the 100 Wireless Multiple photo and video Camera Device 100. The toolbar 136 can be displayed along a vertical edge of the electronic device's display screen, for example as shown in FIG. 5, or in any other orientation or position on the display screen. The user interface may include one or more of the following: a photo button 134, a video button 135, a live focus button 136, a slow-motion button 137, a super slow-motion button 138, a hyper-lapse button 139, various buttons to select which camera lens to use 140, a capture photo and video button 141. In the example of FIG. 5 these functions are all provided in the toolbar 133, but it will be appreciated that fewer or more buttons can be included in the toolbar in which can further provide more features and functions to provide to end user.

Once the user has adjusted the imaging device 100 to the desired settings (e.g. by inputting settings via the user interface of the electronic device), or at any other desired time, the user can actuate an image capture button 141 of the user interface of the electronic device to cause a camera of the imaging device to capture a still image, to start video recording, or to stop video recording if video recording has already begun. Upon actuation of the capture button 141, the processor 111 of the electronic device sends instructions (also referred to as commands) to the imaging device, via the wireless communication link to the imaging device 100 to perform an image capture operation. The captured image or video can then be transmitted over the wireless communication link to the electronic device 102 for display, or playback on the user interface.

In some examples, if the imaging device has a wired data port for receiving a data cable (such as but not limited to a USB port), then commands and/or captured image or video may transmitted over a data cable connecting the imaging device 100 to the electronic device 102. The data cable, if present, may thus be used as a back-up for the wireless communication link.

In one example, commands and/or low definition images for the view finder may be sent over the wireless link, while high definition images may be sent over the data cable. In other examples there may be no wired link, so that all communication is via the wireless communication link.

The electronic device 102 may include a non-transitory computer readable storage medium (such as storage and/or memory 112) storing machine readable instructions which are executable by a processor of an electronic device. The instructions may include instructions to establish a wireless communication link between the electronic device and the imaging device. The instructions may further include instructions to, in response to wirelessly receiving a control command from a user of the electronic device over the wireless communication link, send a control signal over the wireless communication link to the imaging device to control one or more of the plurality of cameras of the imaging device in accordance with the control command received from the user. The instructions may further include instructions to receive image data from the one or more cameras of the imaging device over the wireless communication link.

The instructions may further comprise instructions to display on a display screen of the external electronic device a view finder comprising a stream of images captured by a camera of the plurality of cameras of the imaging device. The control command may for example be a command to activate at least one camera of the plurality of cameras of the imaging device to capture an image and store the captured image on a storage medium of the imaging device and/or transmit the captured image over the wireless communication link for storage on the external electronic device. In one example, the control command is a command to control a parameter of at least one camera of the plurality of cameras of the imaging device. The parameter may for example comprise at least one of shutter speed, aperture size, zoom, focus and flash settings.

In one example the instructions comprise instructions to display on a display of the electronic device one or more controls for adjusting one or more parameters of one or more of the plurality of cameras. In one example, the instructions comprise instructions to control a selected one of the plurality of cameras and receive image data from the selected one of the plurality of cameras. In one example the instructions comprise instructions to simultaneously control two or more of the plurality of cameras and receive image data from two or more of the plurality of cameras.

A method of capturing images using the imaging device of any of the examples above will now be describe. The imaging device may be wirelessly coupled to an external electronic device (such as but not limited to a smartphone) by the wireless interface of the imaging device. A user of the electronic device input a command to the external electronic device to activate one or more cameras of the imaging device. The method may comprise sending from the external electronic device to the imaging device via the wireless interface of the imaging device, an instruction or command to activate one or more cameras of the imaging device. The method may further comprise receiving, by the controller of the imaging device, the instruction from the external electronic device to activate one or more of the cameras of the imaging device and controlling, by the controller of the image device, one or more cameras of the imaging device to capture one or more images in response to the instruction. The method may further comprise sending, by the controller of the imaging device, the one or more captured images to the external electronic device via the wireless interface of the imaging device.

In some examples, the method may further comprise receiving, by the controller of the imaging device, an instruction from the external electronic device to adjust a parameter of one or more of the cameras in the imaging device and adjusting, by the controller of the imaging device, the parameter of the one or more cameras. In this way parameters of the cameras of the imaging device may be adjusted remotely by the electronic device, even if the imaging device does not have a user interface. As the imaging device does not need to have a user interface and/or display screen, the cost of the imaging device may be reduced.

Figure 6:
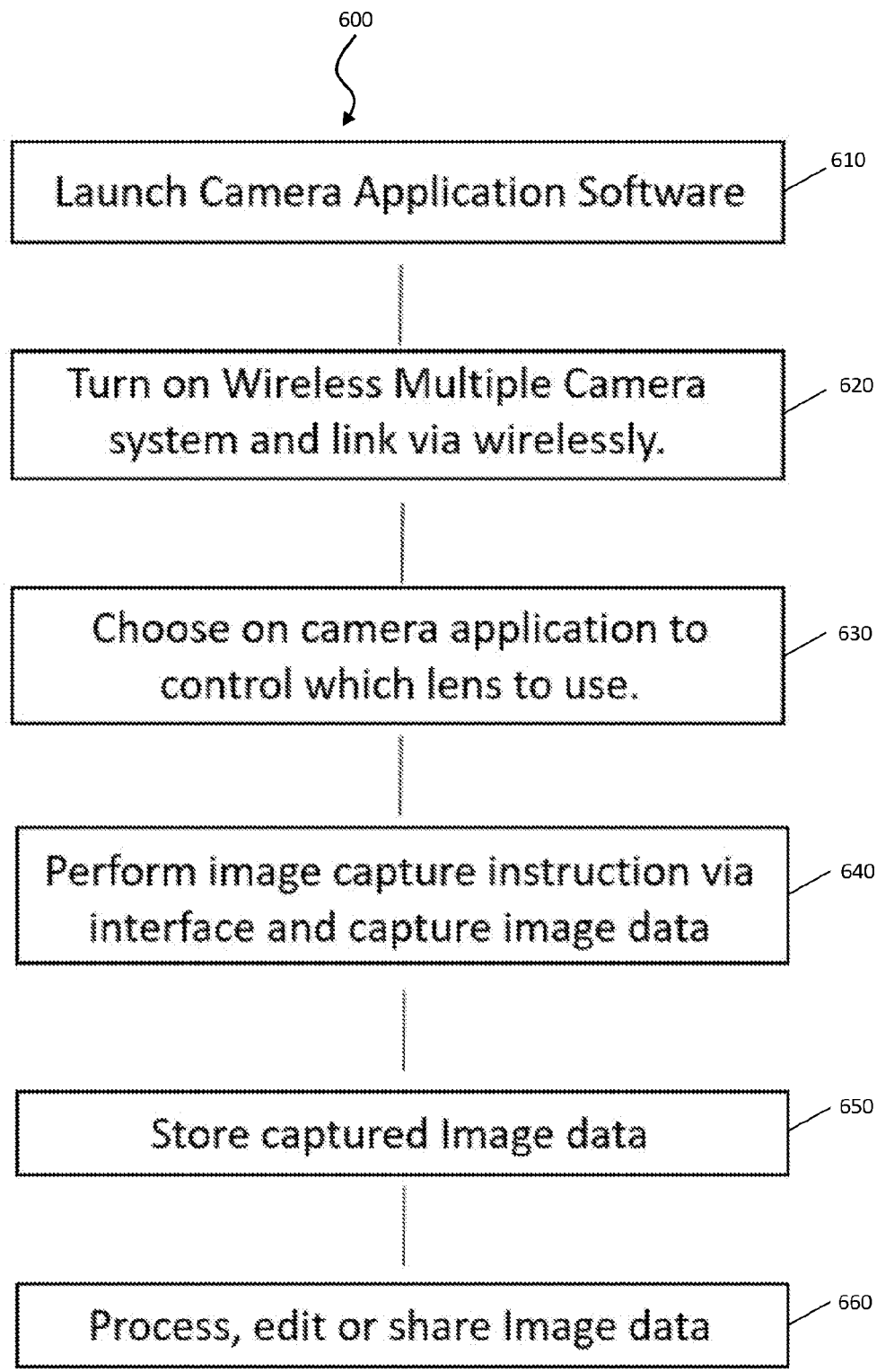
FIG. 6 is a flow chart of one exemplary method of capturing image data.

FIG. 6 illustrates an exemplary method 600 of operating the imaging device 100 and electronic device 102.

At block 610 camera application software is launched on the electronic device.

At block 620 the imaging device (also referred to as a wireless multiple camera system) is turned on and the imaging device is wirelessly linked to the electronic device.

At block 630 a user chooses a camera of the imaging device to use to capture an image or a plurality of images forming a video (this may also be referred to as the user selecting a lens, as each camera has a lens); the user may select the camera through the camera application software running on the electronic device.

At block 640 the imaging device receives an image capture instruction via the wireless interface and performs capture of image data with the selected camera.

At block 650, the captured image data is stored. For example, the captured image data may be transmitted from the imaging device to the electronic device and stored on the electronic device.

At block 660 the image data may be processed, edited or shared. For example, the user of the electronic device may edit the image data and/or send the image to friends or upload to a cloud computing service or social network etc.

Figure 7:
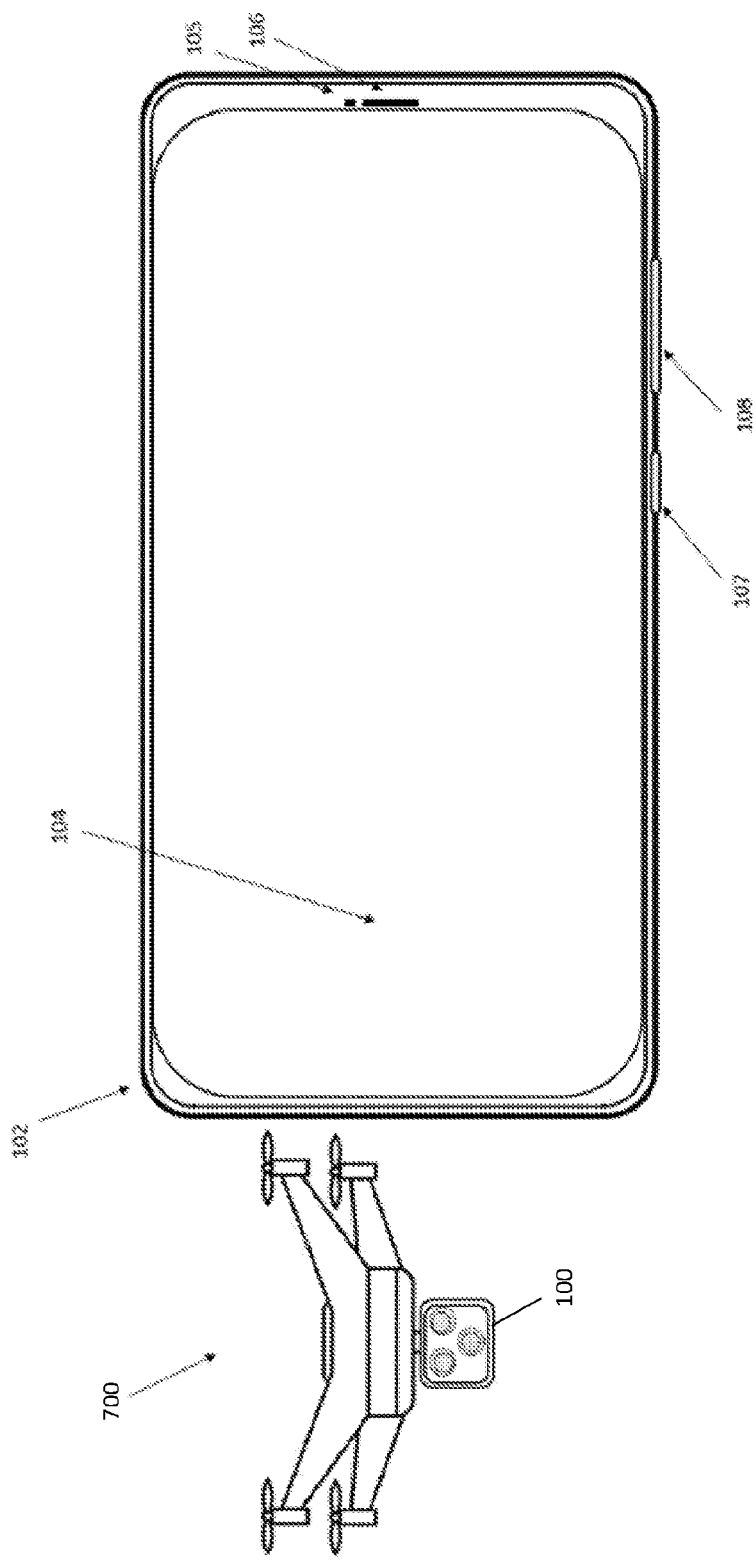
FIG. 7 is a front view of an imaging device attached to a drone and an electronic device for controlling the imaging device.

In some examples, an imaging device 100 of the present disclosure may be attached to or form part of a drone, such as but not limited to a multicopter 700, as shown in FIG. 7. In that case the imaging device may for instance be controlled by a wireless connection, such as but not limited to Wi-Fi, 4g or 5g and above internet connection. In FIG. 7, like parts are designated by like reference numerals as in FIG. 1. The imaging device 100 may include multiple high-quality lens, which may be equipped with optical image stabilization technology. This effectively increases the camera lens and image sensor options that the user can use, compared to conventional multicopters which are equipped with only one camera lens which is designed primarily for video taking. This enables the user to take different types of photos/videos during flight by wirelessly controlling the imaging device via the external electronic device. Furthermore, the enhanced visual options provided by the imaging device may allow allows users to manoeuvre the drone around areas which are out of the line of sight to take better photos/videos and/or a provide first person view to the user. The drone may include includes propellers, motors, rotors, electronic speed controls, removable battery, flight controller, GPS and wireless communication interface, such as but not limited to a sim slot for 4g/5g and above internet connection. In still other examples, the imaging device may be attached to or form part of a vehicle, ship, submarine or space vessel.

Clauses

The following clauses provide further examples of features in some possible embodiments of the present disclosure.

1. A Wireless Multiple photo and video Camera Device, comprising:
   multiple camera components including multiple photo and video taking lenses which includes wide-angle lenses, ultrawide-angle lenses, Macro lenses, telephoto lenses, full-frame image sensors, depth sensors, thermal sensors, other types of camera lenses, multiple image sensors, multiple optic parts, multiple isp panels, Wi-Fi, sim card slots for 4g/5g and above wireless connections, a processor and a frame for housing all the components;
   and an electronic wireless device connector configured to wirelessly link the Wireless Multiple photo and video Camera Device to an electronic device;
   wherein the Wireless Multiple photo and video Camera Device can include a user interface & display interface.

2. The Wireless Multiple photo and video Camera Device of clause 1, wherein the Wireless Multiple photo and video Camera Device does include a power source and is also configured to receive power through the connector from an electronic device or when the Wireless Multiple photo and video Camera Device is connected to a charging device.

3. The Wireless Multiple photo and video Camera Device of clause 1, wherein the Wireless Multiple photo and video Camera Device does include a storage medium option port on the device itself and in the case that the Wireless Multiple photo and video Camera Device does not include a storage medium then is automatically configured to transmit captured image data through a wireless link to an electronic device and/or attached usb c port wire onto electronic device for storage on the electronic device.

4. The Wireless Multiple photo and video Camera Device of clause 1, wherein the camera system does not include a shutter button. Wherein the connector comprises at least one of a micro-USB C connector for charging and/or data transfer purposes. Wherein the multiple image sensors have a resolution of at least 1 or more megapixels. Wherein the multiple lens has an adjustable focal length. Wherein each of the multiple lens can have optical image stabilization. Wherein the Wireless Multiple photo and video Camera Device includes a power button.

5. The Wireless Multiple photo and video Camera Device of clause 1, wherein the housing and size of the wireless multiple photo and camera device itself can be any relevant size to fit the multiple lens correctly.

6. The Wireless Multiple photo and video Camera Device of clause 1, further comprising a Wireless Multiple photo and video Camera Device can be configured to wirelessly link at the same time with one or more electronic devices and/or can be attached to one electronic device via usb type C port for charging, data transfer and image data capture commands.

7. The Wireless Multiple photo and video Camera Device of clause 1, wherein all the different type of lenses in the wireless photo and video camera device can be controlled by user to capture photo and video image data at the same time or user can selectively choose to use one or more different lenses for different photo and video image data taking requirements depending on user requirements.

8. The Wireless Multiple photo and video Camera Device of clause 1, wherein wireless connections can include Wi-Fi, 4g, 5g or above internet connection and can include more than one user to access, view, control and record image data on the wireless multiple photo and video camera device at the same time.

9. A method of capturing image data, comprising:
   Wirelessly linking with a Wireless Multiple photo and video Camera Device having a multiple camera component housing structure, multiple lens, multiple image sensors, multiple sensors and option of an user interface to an electronic device having a processor, a display screen, and an input device, the Wireless Multiple photo and video Camera Device being wirelessly linked to the electronic device;

Launching a camera application on the electronic device to display on the display screen, a control interface for adjusting parameter of the Wireless Multiple photo and video Camera Device and a viewfinder comprising a real-time stream of images and/or video received by one and/or multiple image sensors through one and/or multiple lens;

Actuating the control using the input method of camera application installed on the electronic device to cause the processor of the electronic device to send an instruction to the Wireless Multiple photo and video Camera Device to adjust the parameter; and Actuating a shutter control of the electronic device to cause the processor of the electronic device to send an instruction to the Wireless Multiple photo and video Camera Device to perform an image capture operation, said image capture operation comprising generating image data using the multiple image sensors of the camera device and storing the device image data onto device itself and/or transmitting the generated image data to the electronic device for storage or processing.

10. The method of clause 9, wherein the parameter comprises at least one of shutter speed, aperture size, zoom, focus, flash and other settings.

11. The method of clause 9, wherein the image data comprises at least one of and/or multiple still image data, video image data, and audio data captured by a microphone.

12. The method of clause 9, using the processor of the electronic device, executing a camera application to display on the display screen of the electronic device one or more controls for adjusting parameters of the Wireless Multiple photo and video Camera Device;

13. The method of clause 9, using the processor of the electronic device, executing the camera application to display on the display screen of the electronic device a real-time stream of images captured by the multiple image sensors through the multiple lens and transmitted to the electronic device through a wireless link in such that the display screen acts as a viewfinder for the camera system;

14. The method of clause 9, receiving, via the input electronic device, a user instruction to adjust a parameter of the Wireless Multiple photo and video Camera Device;

15. The method of clause 9, wherein the image data comprises at least one or multiple of still image data, one or multiple video image data, and/or audio data captured by a microphone.

16. The method of clause 9, wherein the display screen is a touch-enabled display and wherein the input device comprises a touch sensor of the touch-enabled display and/or can be other devices that utilized input of keyboard and/or mouse input to control the Wireless Multiple photo and video Camera Device via a camera application.

17. The method of clause 9, in the case if a secure wire connection is required to access and use the wireless multiple photo and video camera device, user can attach an usb C port connector wire from the control electronic device to access to use the Wireless Multiple photo and video Camera Device for the same control methods as mentioned above in method of clause 9 and for captured image data transfer by wire.

18. The method of clause 9, different wireless connection methods include connecting to the Wireless Multiple photo and video Camera Device by Wi-Fi, 4g, 5g and above internet connection via the controlling electronic device by accessing the Wireless Multiple photo and video Camera Device when is turned on and/or on standby mode ready to connect.

Additional Clauses

The following additional clauses provide still further examples of features in some possible embodiments of the present disclosure.

1. A method of capturing images using a imaging device comprising a controller, a plurality of cameras and a wireless interface, the method comprising:

coupling, by the wireless interface of the imaging device, the imaging device to an external electronic device;

receiving, at the external electronic device, a command from a user to activate one or more cameras of the imaging device;

sending, from the external electronic device to the imaging device via the wireless interface of the imaging device, an instruction to activate one or more cameras of the imaging device;

receiving, by the controller of the imaging device, the instruction from the external electronic device to activate one or more of the cameras of the imaging device;

controlling, by the controller of the image device, one or more cameras of the imaging device to capture one or more images in response to the instruction; and sending, by the controller of the imaging device, the one or more captured images to the external electronic device via the wireless interface of the imaging device.

2. The method of clause 1 further comprising receiving, by the controller of the imaging device, an instruction from the external electronic device to adjust a parameter of one or more of the cameras in the imaging device and adjusting, by the controller of the imaging device, the parameter of the one or more cameras.

3. An imaging device for capturing photos and/or videos, comprising:

multiple camera components including multiple lenses, multiple image sensors and multiple image signal processor (isp) panels;

a processor and a frame for housing the multiple camera components; and an electronic wireless connector configured to wirelessly link the imaging device to an external electronic device.

4. The imaging device of clause 3 wherein the imaging device includes a display and a user interface.

5. The imaging device of any one of clauses 3-4 wherein the multiple camera components include one or more components selected from the list comprising multiple optic parts, depth sensors and/or thermal sensors and wherein one or more of the multiple image sensors may be a full-frame image sensor.

6. The imaging device of any one of clauses 3-5, wherein the multiple camera components include Wi-Fi and/or, sim card slots for wireless connections, such as 4G or 5G.

7. The imaging device of any one of clauses 3-6, wherein the multiple lenses include one or more of the following: wide angle lenses, ultra-wide angle lenses, Macro lenses and telephoto lenses.
8. The imaging device of any one of clauses 3-7 wherein the imaging device is configured to receive power through the electronic wireless device connector.
9. The imaging device of any one of clauses 3-7 wherein the electronic device is configured to receive power from an external charging device connectable to the imaging device.
10. The imaging device of any one of clauses 3-9, wherein the imaging device includes a storage medium and is configured to store image data captured by the multiple camera components on the storage medium.
11. The imaging device of any one of clauses 3-10 wherein the imaging device is configured to transmit captured image data through the electronic wireless device connector to an electronic device for storage on the electronic device.
12. The imaging device of any one of clauses 3-11 wherein the imaging device is configured to transmit captured image data through a usb c port of the imaging device over a wired link to an electronic device for storage on the electronic device.
13. The imaging device of any one of clauses 3-12, wherein the imaging device does not include a shutter button.
14. The imaging device of any of clauses 3-13 wherein the imaging device is configured to wireless link to two or more electronic devices at the same time.
15. The imaging device of any of clauses 3-14 wherein the imaging device has a usb type C port for charging, data transfer to an electronic device and receiving image data capture commands from an electronic device.
16. The imaging device of any of clauses 3-15, wherein the imaging device comprises a plurality of different types of lenses and wherein the imaging device is controllable by a user to capture image data from the plurality of different types of lenses at the same time.
17. The imaging device of any of clauses 3-15, wherein the imaging device comprises a plurality of different types of lenses and wherein the imaging device is controllable by a user to capture image data from a selected one or more of the lenses.
18. The imaging device of any of clauses 3-17, wherein the imaging device is configured to be accessible by at two different users via the electronic wireless device connector so as to enable the users to control the multiple camera components and access, view, and record image data captured by the multiple camera components.
19. A method of capturing image data, comprising:
    wirelessly linking an imaging device comprising a housing structure and multiple lens and image sensors with an electronic device comprising a processor and a display screen;
    launching a camera application on the electronic device to display on the display screen of the electronic device, a control interface for adjusting a parameter of the imaging device and a viewfinder comprising a real-time stream of images and/or video received by one or lenses and image sensors of the imaging device;
    actuating the control interface of the camera application to cause the processor of the electronic device to send an instruction to the imaging device to adjust the parameter of the imaging device; and
    actuating a shutter control of the electronic device to cause the processor of the electronic device to send an instruction to the imaging device to perform an image capture operation, said image capture operation comprising generating image data using one or more of the multiple image sensors and one or more the multiple lenses of the camera device and storing the device image data onto device itself and/or transmitting the generated image data to the electronic device for storage or processing.
20. The method of clause 19 wherein the imaging device comprises multiple sensors, isp panels and/or a user interface.
21. The method of clause 19 or 20 wherein the parameter comprises at least one of shutter speed, aperture size, zoom, focus, flash and other settings.
22. The method of any of clauses 19 to 21, wherein the generated image data comprises still image data, video image data, and/or audio data captured by a microphone of the imaging device.
23. The method of any one of clauses 19 to 22 wherein the camera application of the electronic device displays, on the display screen of the electronic device, one or more controls for adjusting parameters of the imaging device.
24. The method of any one of clauses 19 to 13, comprising displaying on the display screen of the electronic device a real-time stream of images captured by one or more of the multiple image sensors through one or more of the multiple lenses of the imaging device such that the display screen of the electronic device acts as a viewfinder of the imaging device, said real-time stream of images being transmitted to the electronic device through a wireless link.
25. The method of any one of clauses 19 to 14, comprising receiving, via a user input of the electronic device, a user instruction to adjust a parameter of the imaging device.
26. The method of clause 25, wherein the display screen of the electronic device is a touch-enabled display and acts as both a display and user input of the electronic device.
27. The method of clause 25, wherein electronic device is configured to receive input from a keyboard and/or mouse to control the camera application.
28. The method of any one of clauses 19 to 27 wherein the imaging device is connected to the electronic device by a usb C port connector wire and wherein the user accesses and/or controls the imaging device from the electronic device via the wire and captured image data is transferred to the electronic device by the wire.
29. The imaging device of any one of the above clauses wherein the imaging device is attached to or forms part of a drone.
30. An imaging device, comprising: a controller; a plurality of cameras, each camera comprising a lens and a corresponding image sensor; and an interface for coupling the imaging device to an external electronic device. The controller is configured to control one or more of the cameras according to a command received from an external electronic device to capture images and send the captured images to the external electronic device when the imaging device is coupled to the external electronic device via the interface. In one example a transitory computer readable storage medium stores instructions which are executable by a processor of an electronic device to: establish a communication link between the electronic device and the imaging device; and in response to receiving a control command from a user of the electronic device, send a control signal over the communication link to the imaging device to control one or more of the plurality of cameras of the imaging device in accordance with the control command received from the user; and receive image data from the one or more cameras of the imaging device over the communication link.

In some examples the method may include, using the image device to stream live feed data to the principle electronic device in which this live feed can be uploaded to an online storage system and/or shared with another user in which is allowed access to see the live feed with the principle electronic device authorization to do so. In some examples, the method may include, using the processor of the electronic device, executing the camera application to display on the view of the imaging device which is a real-time stream of image data or stream of multiple image data captured by multiple image sensors through multiple lens and transmitted to the electronic device through the connector such that the display screen acts as a viewfinder for the imaging device.

In some examples, a method of capturing image data using the imaging device wirelessly connected to an electronic device is provided, the imaging device having multiple camera components including multiple lens, multiple image sensors, a processor, several connectors, and option of a user interface and display interface, the electronic device having a display screen.

In some examples, the method may include receiving, at the processor of the imaging device, an instruction from the wirelessly connected electronic device to adjust a parameter of the imaging device. The method may include, in response to said instruction, adjusting a setting of the imaging device. The setting may include at least one of shutter speed, aperture size, zoom, focus, and flash. The method may include transmitting one or multiple real-time feed of image data captured through one or multiple lens by one or more multiple image sensors to the wirelessly linked electronic device for display as a viewfinder on the display screen of the electronic device.

The above embodiments are described by way of example only. Many variations are possible without departing from the scope of the disclosure as defined in the appended claims.

While various methods disclosed herein may be shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowchart(s) are merely exemplary embodiments, various other methods that include additional steps or include fewer steps than illustrated are also within the scope of the present disclosure.

For clarity of explanation, in some instances the present technology has been presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media, Such instructions can comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of farm factors. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is to be understood that any feature described in relation to any one example may be used alone, or in combination with other features described, and may also be used in combination with any features of any other of the examples, or any combination of any other of the examples.

The invention claimed is:

1. An imaging device, comprising: a controller; a plurality of cameras in communication with said controller, each camera comprising a lens, an image sensor and an image signal processor; and a wireless interface for coupling the controller to an external electronic device; wherein the controller is configured to control the plurality of cameras according to a command received from the external electronic device to capture an image data and send the captured image data to the external electronic device when the imaging device is coupled to the external electronic device via the wireless interface, wherein at least some of the plurality of the cameras of the imaging device have different types of lenses to each other, and wherein the imaging device is controllable by a user to capture image data from at least two of the plurality of cameras with different types of lenses at the same time, wherein the captured image data comprises still image data and video image data comprising multiple images.

2. The imaging device of claim 1 wherein the lenses of cameras are selected from the group comprising a wide-angle lens, an ultrawide-angle lens, a macro lens and a telephoto lens.

3. The imaging device of claim 1, wherein the controller is configured to control the plurality of cameras according to a command received from the external electronic device to capture a plurality of successive images forming a video and send the video to the external electronic device when the imaging device is coupled to the external electronic device via the wireless interface.

4. The imaging device of claim 1, wherein the imaging device is configured to be coupled by the wireless interface to two or more external electronic devices at the same time.

5. The imaging device of claim 1, wherein the wireless interface comprises Wi-Fi, Bluetooth, near field communication (NFC), infra-red (IR) or cellular transceiver.

6. The imaging device of claim 1, wherein the imaging device further comprises a port for connecting the imaging device to an external electronic device via a data cable.

7. The imaging device of claim 1, further comprising a power module configured to receive power from an external power source.

8. The imaging device of claim 1, wherein the imaging device does not include a shutter button for activating a camera to capture an image data.

9. A non-transitory computer readable storage medium storing instructions which are executable by a processor of an external electronic device to:
   establish a wireless communication link between the external electronic device and the imaging device of claim 1, wherein the external electronic device is external to the imaging device;
   in response to wirelessly receiving a control command from a user of the external electronic device over the wireless communication link, send a control signal over the wireless communication link to the imaging device to control the plurality of cameras of the imaging device in accordance with the control command received from the user; and
   receive image data from the plurality of cameras of the imaging device over the wireless communication link.

10. The computer readable storage medium of claim 9 wherein the instructions further comprise instructions to display on a display screen of the external electronic device a view finder comprising a stream of images captured by a camera of the plurality of cameras of the imaging device.

11. The computer readable storage medium of claim 9 wherein the control command is a command to activate at least one camera of the plurality of cameras of the imaging device to capture image data and store the captured image data on a storage medium of the imaging device and/or transmit the captured image data over the wireless communication link for storage on the external electronic device.

12. The computer readable storage medium of claim 9 wherein the control command is a command to control a parameter of at least one camera of the plurality of cameras of the imaging device.

13. The computer readable storage medium of claim 12 wherein the parameter comprises at least one of shutter speed, aperture size, zoom, focus and flash settings.

14. The computer readable storage medium of claim 9 wherein the instructions comprise instructions to display on a display of the electronic device one or more controls for adjusting one or more parameters of one or more of the plurality of cameras.

15. The computer readable storage medium of claim 9 wherein the instructions comprise instructions to control a selected one of the plurality of cameras and receive image data from the selected one of the plurality of cameras.

16. The computer readable storage medium of claim 9 wherein the instructions comprise instructions to simultaneously control two or more of the plurality of cameras and receive image data from two or more of the plurality of cameras.

17. A method of capturing image data using a imaging device comprising a controller, a plurality of cameras and a wireless interface, the method comprising:
   coupling, by the wireless interface of the imaging device, the controller of the imaging device to an external electronic device;
   receiving, at the external electronic device, a command from a user to activate a plurality of the cameras of the imaging device;
   sending, from the external electronic device to the imaging device via the wireless interface of the imaging device, an instruction to activate the plurality cameras of the imaging device;
   receiving, by the controller of the imaging device, the instruction from the external electronic device to activate the plurality cameras of the imaging device;
   controlling, by the controller of the image device, the plurality of cameras of the imaging device to capture a plurality of different types of image data in response to the instruction using different types of lenses of said plurality of cameras to capture said plurality of different types of image data at the same time; and
   sending, by the controller of the imaging device, the plurality of different types of captured image data to the external electronic device via the wireless interface of the imaging device.

18. The method of claim 17 further comprising receiving, by the controller of the imaging device, an instruction from the external electronic device to adjust a parameter of one or more of the cameras in the imaging device and adjusting, by the controller of the imaging device, the parameter of the one or more cameras.

19. An imaging device for capturing photos and/or videos, comprising:
   multiple camera components including multiple lenses of different types, multiple image sensors and multiple image signal processor panels;
   a processor and a frame for housing the multiple camera components; and
   an electronic wireless connector configured to wirelessly link the imaging device to an external electronic device,
   wherein the imaging device is controllable by a user to capture image data from the multiple lenses at the same time, and wherein the captured image data comprises still image data and video image data.

* * * * *